(12) United States Patent
Kimura et al.

(10) Patent No.: US 9,992,666 B2
(45) Date of Patent: Jun. 5, 2018

(54) APPARATUS, PROGRAM, AND METHOD

(71) Applicant: SONY CORPORATION, Tokyo (JP)

(72) Inventors: Ryota Kimura, Tokyo (JP); Ryo Sawai, Tokyo (JP); Hiromasa Uchiyama, Kanagawa (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/036,739

(22) PCT Filed: Jan. 13, 2015

(86) PCT No.: PCT/JP2015/050679
§ 371 (c)(1),
(2) Date: May 13, 2016

(87) PCT Pub. No.: WO2015/122225
PCT Pub. Date: Aug. 20, 2015

(65) Prior Publication Data
US 2016/0262012 A1    Sep. 8, 2016

(30) Foreign Application Priority Data

Feb. 14, 2014    (JP) ................................. 2014-026313

(51) Int. Cl.
*H04W 8/24*    (2009.01)
*H04M 15/00*    (2006.01)
(Continued)

(52) U.S. Cl.
CPC ............... *H04W 8/24* (2013.01); *H04L 63/30* (2013.01); *H04M 3/2281* (2013.01);
(Continued)

(58) Field of Classification Search
CPC .......... H04M 15/8214; H04M 3/2281; H04W 40/02; H04W 76/023; H04W 8/005; H04W 8/24
(Continued)

(56) References Cited

U.S. PATENT DOCUMENTS 8,712,883 B1 *    4/2014 Yang ..................... H04L 12/14
375/240
2007/0111742 A1    5/2007 Zhang et al.
(Continued)

FOREIGN PATENT DOCUMENTS

JP    2007-512755 A    5/2007
JP    2012-110035 A    6/2012
(Continued)

OTHER PUBLICATIONS

International Search Report dated Apr. 7, 2015, in PCT/JP2015/050679 filed Jan. 13, 2015.

*Primary Examiner* — Babar Sarwar
(74) *Attorney, Agent, or Firm* — Oblon, McClelland, Maier & Neustadt, L.L.P.

(57) ABSTRACT

[Object] To be able to perform management involved with wireless communication without routing via a base station. [Solution] Provided is an apparatus including: a generation unit configured to generate information related to data wirelessly transmitted or received without being routed via a base station; and a control unit configured to control transmission of the information to a node which is not involved in the transmission or reception of the data.

19 Claims, 15 Drawing Sheets

(51) Int. Cl.
*H04M 3/22* (2006.01)
*H04W 76/02* (2009.01)
*H04L 29/06* (2006.01)
*H04W 12/02* (2009.01)
*H04W 8/00* (2009.01)
*H04W 40/02* (2009.01)
*H04W 88/04* (2009.01)
*H04W 24/02* (2009.01)

(52) U.S. Cl.
CPC ....... *H04M 15/43* (2013.01); *H04M 15/8214* (2013.01); *H04W 12/02* (2013.01); *H04W 76/023* (2013.01); *H04W 8/005* (2013.01); *H04W 24/02* (2013.01); *H04W 40/02* (2013.01); *H04W 88/04* (2013.01)

(58) Field of Classification Search
USPC ............... 455/406–407, 404.2, 412.1–414.2, 455/418–422.1, 41.1–41.2, 456.1, 456.2, 455/456.3, 552.1, 550.1; 370/328–332, 370/338
See application file for complete search history.

(56) References Cited

U.S. PATENT DOCUMENTS

| | | | |
|---|---|---|---|
| 2010/0190469 A1* | 7/2010 | Vanderveen | H04L 12/14 455/406 |
| 2011/0084807 A1* | 4/2011 | Logan | H04Q 9/00 340/10.1 |
| 2011/0103319 A1 | 5/2011 | Abraham et al. | |
| 2011/0151887 A1* | 6/2011 | Hakola | H04L 5/001 455/452.2 |
| 2013/0121227 A1 | 5/2013 | Abraham et al. | |
| 2013/0290696 A1 | 10/2013 | Broustis et al. | |
| 2014/0378123 A1* | 12/2014 | Stojanovski | H04W 52/0251 455/422.1 |
| 2015/0052580 A1* | 2/2015 | Delsol | H04L 63/20 726/3 |
| 2015/0282229 A1* | 10/2015 | Vedula | H04W 76/023 370/338 |
| 2015/0327006 A1* | 11/2015 | Chiou | H04W 4/02 455/456.1 |
| 2015/0341150 A1* | 11/2015 | Seo | H04B 7/2656 370/336 |
| 2015/0350459 A1* | 12/2015 | Isobe | H04M 15/80 455/406 |
| 2016/0219541 A1* | 7/2016 | Chatterjee | H04W 36/0055 |
| 2016/0255669 A1* | 9/2016 | Fodor | H04B 7/0413 370/329 |
| 2016/0295565 A1* | 10/2016 | Kim | H04W 72/04 |

FOREIGN PATENT DOCUMENTS

| | | |
|---|---|---|
| JP | 2013-509827 A | 3/2013 |
| JP | 2013-229746 A | 11/2013 |
| JP | 2014-171093 A | 9/2014 |

* cited by examiner

◄──► COMMUNICATION VIA RELAY NODE

APPARATUS, PROGRAM, AND METHOD

TECHNICAL FIELD

The present disclosure relates to apparatuses, programs, and methods.

BACKGROUND ART

The recent increase in the number of smartphones has led to a significant increase in traffic on mobile communication networks. Therefore, the off-loading of data by device-to-device (D2D) communication or the like has been studied. For example, the 3rd Generation Partnership Project (3GPP) standardization group has focused on D2D communication as a key technical area necessary for Long Term Evolution (LTE).

For example, Patent Literature 1 discloses a technique of allowing a terminal to divide transmission packets into first packets and second packets, transmit the first packets directly to a second terminal, and transmit the second packets to the second terminal via a base station.

CITATION LIST

Patent Literature

Patent Literature 1: JP 2012-110035A

SUMMARY OF INVENTION

Technical Problem

However, in the conventional art including the technique disclosed in Patent Literature 1 above, when data is transmitted or received by D2D communication without routing via a base station, no nodes on a network can know whether or not data is being transmitted or received and what data is transmitted or received, or the like. Therefore, it may be difficult to manage such data transmission or reception.

With the above in mind, it is desirable to provide a scheme of allowing management involved with wireless communication without routing via a base station.

Solution to Problem

According to the present disclosure, there is provided an apparatus including: a generation unit configured to generate information related to data wirelessly transmitted or received without being routed via a base station; and a control unit configured to control transmission of the information to a node which is not involved in the transmission or reception of the data.

According to the present disclosure, there is provided a program for causing a processor to execute: generating information related to data wirelessly transmitted or received without being routed via a base station; and controlling transmission of the information to a node which is not involved in the transmission or reception of the data.

According to the present disclosure, there is provided a method including: generating information related to data wirelessly transmitted or received without being routed via a base station; and controlling transmission of the information to a node which is not involved in the transmission or reception of the data.

Advantageous Effects of Invention

As described above, according to the present disclosure, management involved with wireless communication without routing via a base station can be performed. Note that the above advantageous effect is not strictly limiting, and that any advantageous effect indicated in the present disclosure or another advantageous effect that may be reasoned from the present disclosure may also be exhibited in addition to, or instead of, the above advantageous effect.

DESCRIPTION OF EMBODIMENT(S)

Figure 1:
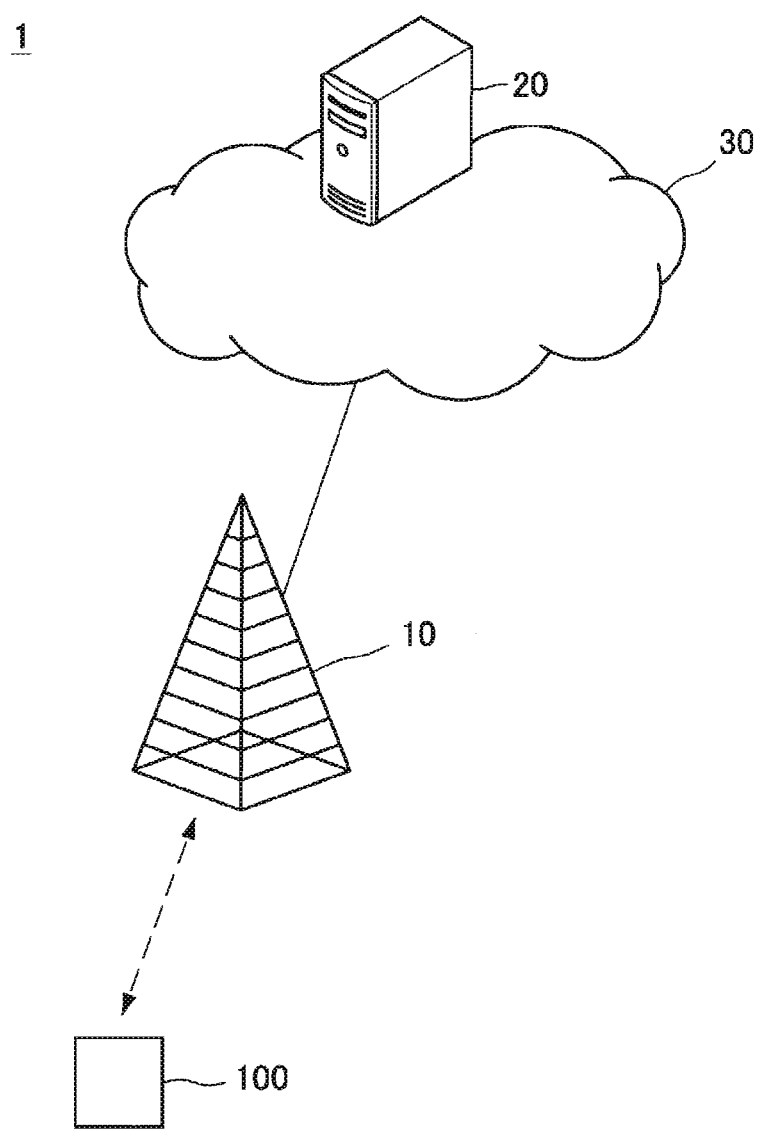
FIG. 1 is an illustrative diagram illustrating an example of a general configuration of a communication system 1 according to an embodiment of the present disclosure.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Note that description will be described in the following order.

1. Configuration of Communication System
1.1. General Configuration of Communication System
1.2. Specific Examples of Communication Apparatus
2. Configuration of Communication Apparatus 3. Flow of Process
4. Variations
5. Application Examples
6. Conclusion

1. CONFIGURATION OF COMMUNICATION SYSTEM

Firstly, a configuration of a communication system according to an embodiment of the present disclosure will be described with reference to FIGS. 1-5.

1.1. General Configuration of Communication System

A general configuration of a communication system 1 according to this embodiment will be described with reference to FIG. 1. FIG. 1 is an illustrative diagram illustrating an example of the general configuration of the communication system 1 according to this embodiment. Referring to FIG. 1, the communication system 1 includes a base station 10, a management node 20, and a communication apparatus 100.

The base station 10 performs wireless communication with an apparatus located within the communication area (i.e., a cell) of the base station 10. For example, when the communication apparatus 100 is located within the communication area, the base station 10 performs wireless communication with the communication apparatus 100.

The management node 20 performs management involved with wireless communication. For example, the management node 20 is a node in a mobile communication network including the base station 10. More specifically, for example, the management node 20 is a core network node located within a core network 30.

The communication apparatus 100 performs wireless communication. For example, the communication apparatus 100, when located within the communication area (i.e., a cell) of the base station 10, performs wireless communication with the base station 10. Also, for example, the communication apparatus 100 performs wireless communication without routing via the base station 10.

According to this embodiment, the communication apparatus 100 generates information related to data which is wirelessly transmitted or received without being routed via the base station 10 (hereinafter referred to as "data-related information"), and transmits the data-related information to a node which is not involved with the transmission or reception of the data. Note that the node is the management node 20. Also, the communication apparatus 100 is involved with the transmission or reception of the data.

1.2. Specific Examples of Communication Apparatus

Next, specific examples of the communication apparatus 100 will be described with reference to FIGS. 2-4.

First Example

In a first example, the communication apparatus 100 performs D2D communication, and the data wirelessly transmitted or received without being routed via the base station 10 is data which is transmitted or received by D2D communication. This example will now be more specifically described with reference to FIG. 2.

Figure 2:
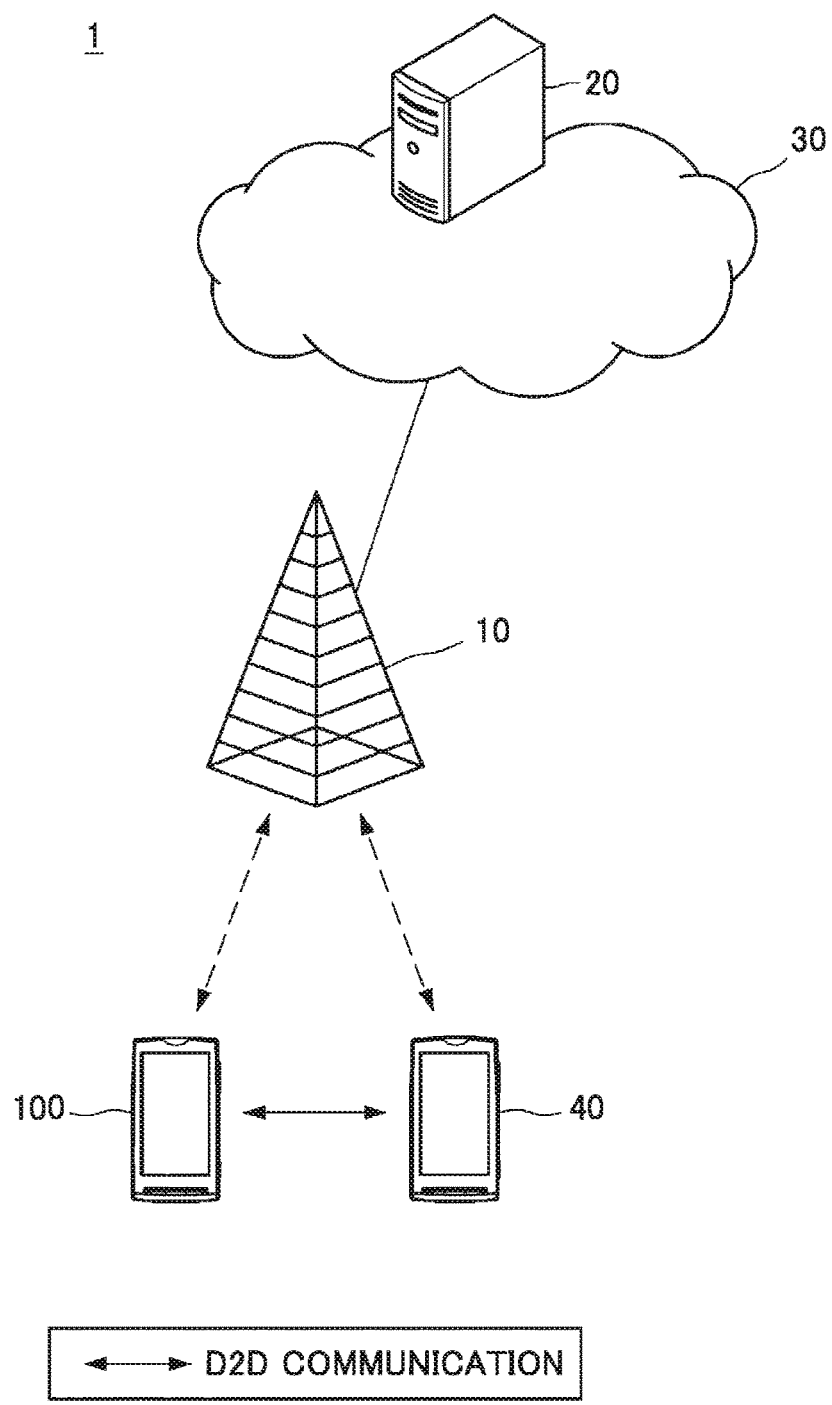
FIG. 2 is an illustrative diagram for describing a first specific example of a communication apparatus according to the embodiment.

FIG. 2 is an illustrative diagram for describing a first specific example of the communication apparatus 100 according to this embodiment. Referring to FIG. 2, in addition to the base station 10 and the management node 20, the communication apparatus 100, which is a terminal apparatus, and a terminal apparatus 41 are shown. In this example, the communication apparatus 100 performs D2D communication with the terminal apparatus 41. The communication apparatus 100 also generates data-related information related to data transmitted or received by D2D communication, and transmits the data-related information to the management node 20. Note that the communication apparatus 100 may be either a source of data in D2D communication or a destination of data in D2D communication.

As a result, for example, management involved with D2D communication can be performed.

Second Example

In a second example, the communication apparatus 100 performs wireless communication within a localized network (LN), and the data wirelessly transmitted or received without being routed via the base station 10 is data transmitted or received within an LN. This example will now be more specifically described with reference to FIG. 3.

Figure 3:
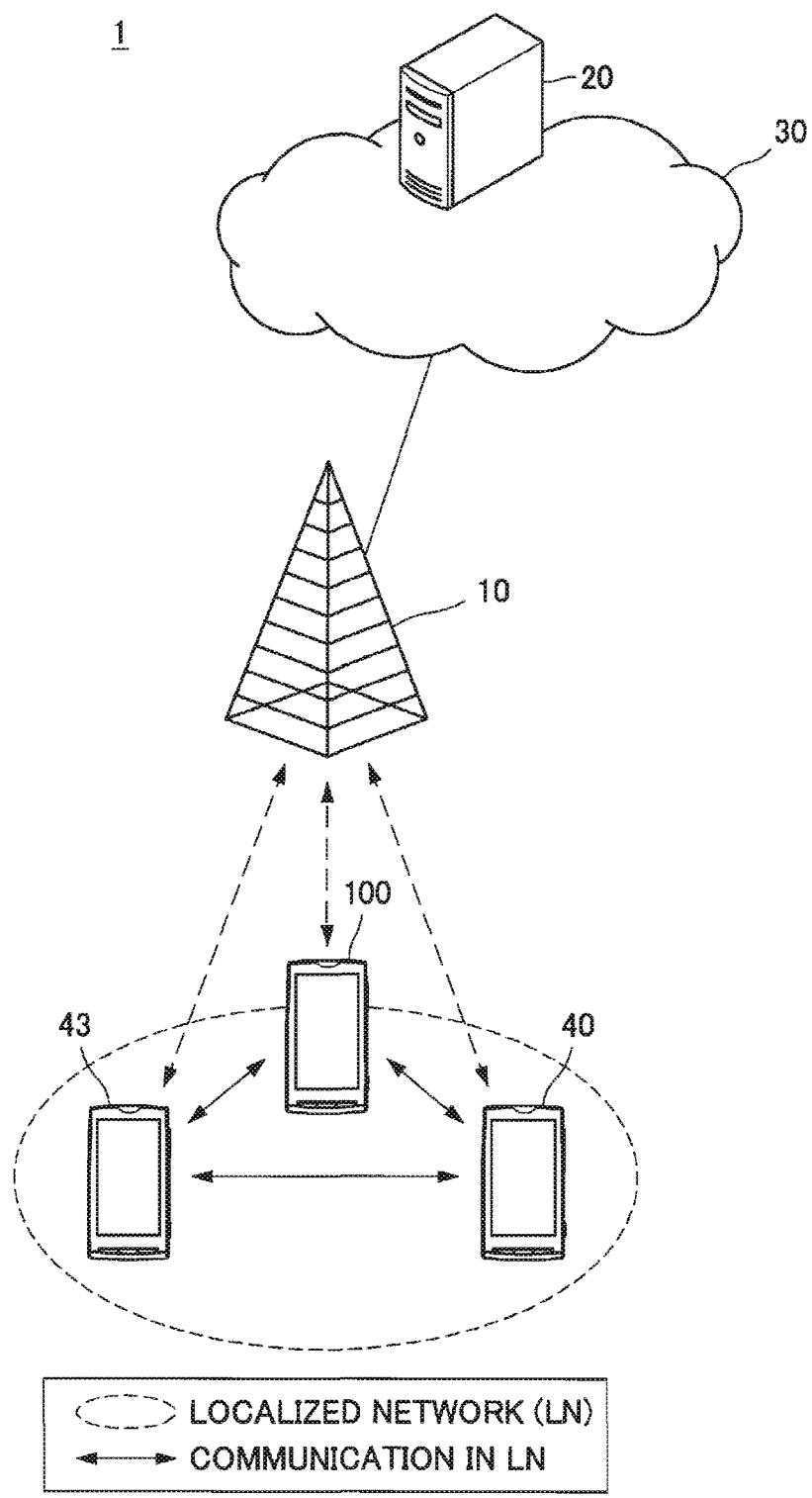
FIG. 3 is an illustrative diagram for describing a second specific example of a communication apparatus according to the embodiment.

FIG. 3 is an illustrative diagram for describing a second specific example of the communication apparatus 100 according to this embodiment. Referring to FIG. 3, in addition to the base station 10 and the management node 20, the communication apparatus 100, a terminal apparatus 43, and a terminal apparatus 45 which are a terminal apparatus, are shown. In this example, the communication apparatus 100, the terminal apparatus 43, and the terminal apparatus 45 form an LN, and perform wireless communication within the LN. The communication apparatus 100 generates data-related information related to data transmitted or received within the LN, and transmits the data-related information to the management node 20. For example, the communication apparatus 100 is a master node which performs control of wireless communication within the LN (e.g., scheduling of wireless communication within the LN, etc.). In this case, the terminal apparatus 43 and the terminal apparatus 45 are a slave node which performs wireless communication under the control of the master node. Note that when two slave nodes (the terminal apparatus 43 and the terminal apparatus 45) transmit and receive data, the communication apparatus 100 acquires information related to data transmitted or received from one of the two slave nodes.

As a result, for example, management involved with wireless communication within an LN can be performed.

Although an example in which the communication apparatus 100 is a master node has been described, this embodiment is not limited to this example. For example, the communication apparatus 100 may be a slave node instead of a master node. In this case, the communication apparatus 100 may be a slave node which is a source of data, or a slave node which is a destination of data.

Third Example

In a third example, the communication apparatus 100 communicates with another apparatus via a relay node, and the data wirelessly transmitted or received without being routed via the base station 10 is data which is transmitted or received via a relay node. This example will now be more specifically described with reference to FIG. 4.

Figure 4:
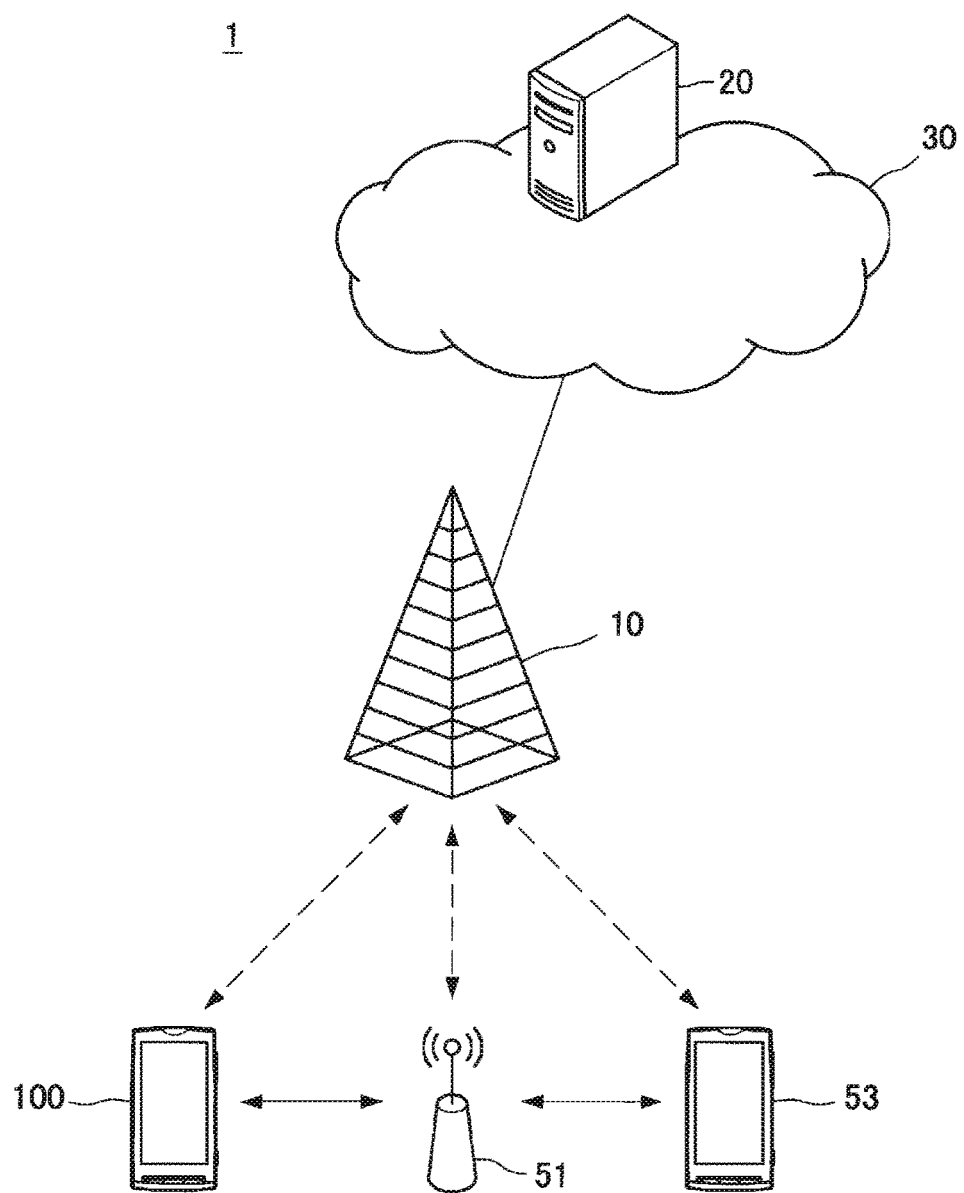
FIG. 4 is an illustrative diagram for describing a third specific example of a communication apparatus according to the embodiment.

FIG. 4 is an illustrative diagram for describing a third specific example of the communication apparatus 100 according to this embodiment. Referring to FIG. 4, in addition to the base station 10 and the management node 20, the communication apparatus 100, which is a terminal apparatus, a relay node 51, and a terminal apparatus 53 are shown. In this example, the communication apparatus 100 communicates with the terminal apparatus 53 via the relay node 51. The communication apparatus 100 generates data-related information related to data transmitted or received via the relay node 51, and transmits the data-related information to the management node 20. Note that the communication apparatus 100 may be either a source of data, or a destination of data in D2D conummication.

As a result, for example, management involved with wireless communication via a relay node can be performed.

Fourth Example

In a fourth example, the communication apparatus 100 is a relay node, and the data wirelessly transmitted or received without being routed via the base station 10 is data which is transmitted or received via a relay node (i.e., the communication apparatus 100). This example will now be more specifically described with reference to FIG. 5.

Figure 5:
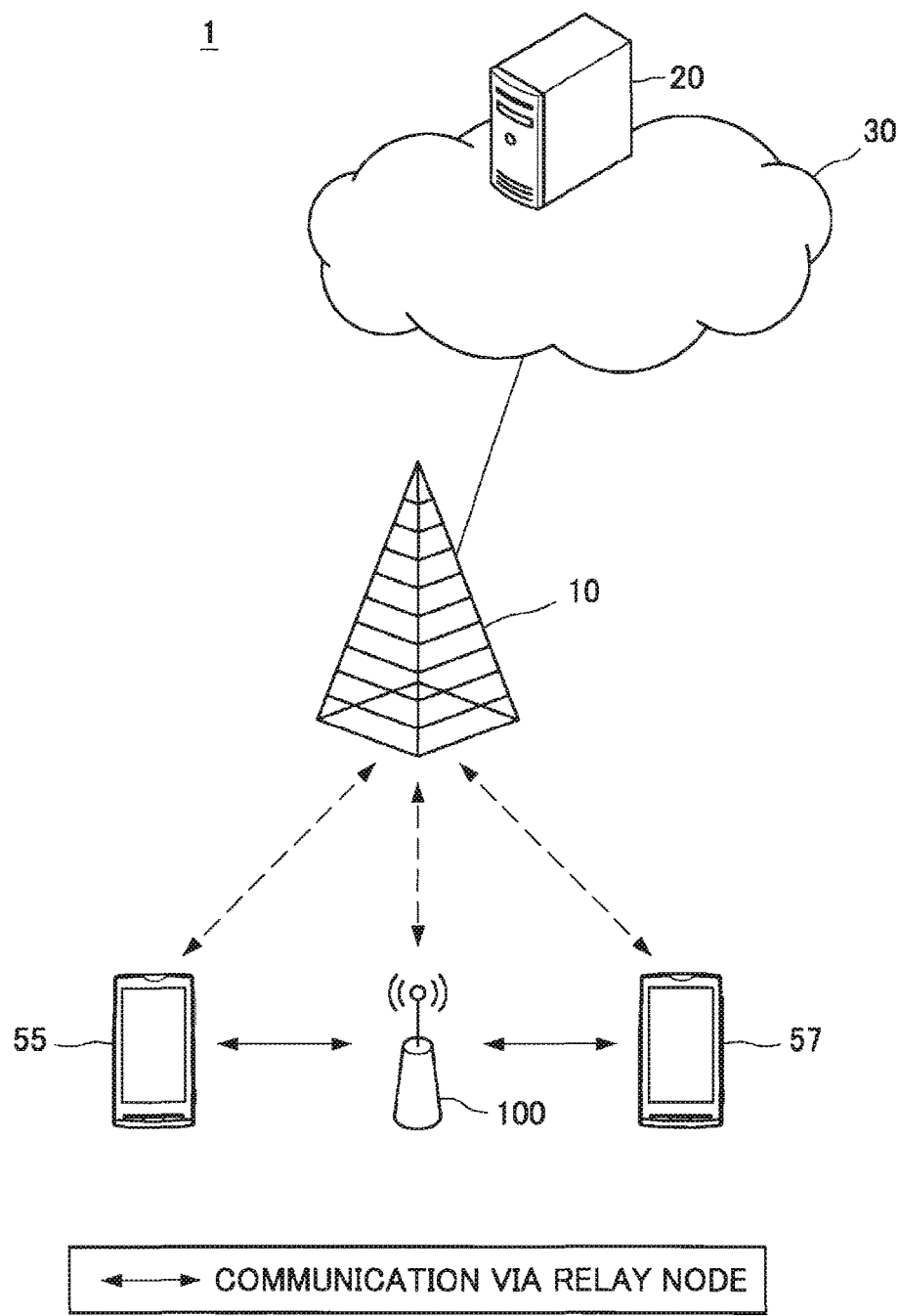
FIG. 5 is an illustrative diagram for describing a fourth specific example of a communication apparatus according to the embodiment.

FIG. 5 is an illustrative diagram for describing a fourth specific example of the communication apparatus 100 according to this embodiment. Referring to FIG. 5, in addition to the base station 10 and the management node 20, the communication apparatus 100, which is a relay node, a teiminal apparatus 55, and a terminal apparatus 57 are shown. In this example, the communication apparatus 100 performs relay between the terminal apparatus 55 and the terminal apparatus 57. The communication apparatus 100 generates data-related information related to data transmitted or received via the communication apparatus 100, which is a relay node, and transmits the data-related information to the management node 20.

As a result, for example, management involved with wireless communication via a relay node can be performed.

In the foregoing, specific examples of the communication apparatus 100 have been described with reference to FIGS. 2-5. Note that, for example, the data wirelessly transmitted or received without being routed via the base station 10 is transmitted or received according to the same wireless communication scheme as that which is used by the base station 10, As an example, the wireless communication scheme is a multiple access scheme, such as orthogonal frequency division multiple access (OFDMA), single carrier frequency division multiple access (SC-FDMA), frequency division multiple access (FDMA), or time division multiple access (TDMA). As another example, the wireless communication scheme may be a multiplexing scheme, such as orthogonal frequency division multiplexing (OFDM), frequency division multiplexing (FDM), or time division multiplexing (TDM).

Instead of a single communication apparatus 100, two communication apparatuses 100 (or three or more communication apparatuses 100) may generate data-related information, and transmit the data-related information to the management node 20. For example, one communication apparatus 100 which is a source of data, and another communication apparatus 100 which is a destination of the data, may each generate data-related information related to the data, and transmit the data-related information to the management node 20. As a result, for example, the reliability of data-related information can be improved. As an example, even if data-related information transmitted by one communication apparatus 100 fails to reach the management node 20, data-related information transmitted by another communication apparatus 100 may reach the management node 20. As another example, even if data-related information transmitted by one communication apparatus 100 is information generated without authorization, the data-related information can be verified using data-related information transmitted by another communication apparatus 100.

2. CONFIGURATION OF COMMUNICATION APPARATUS

Figure 6:
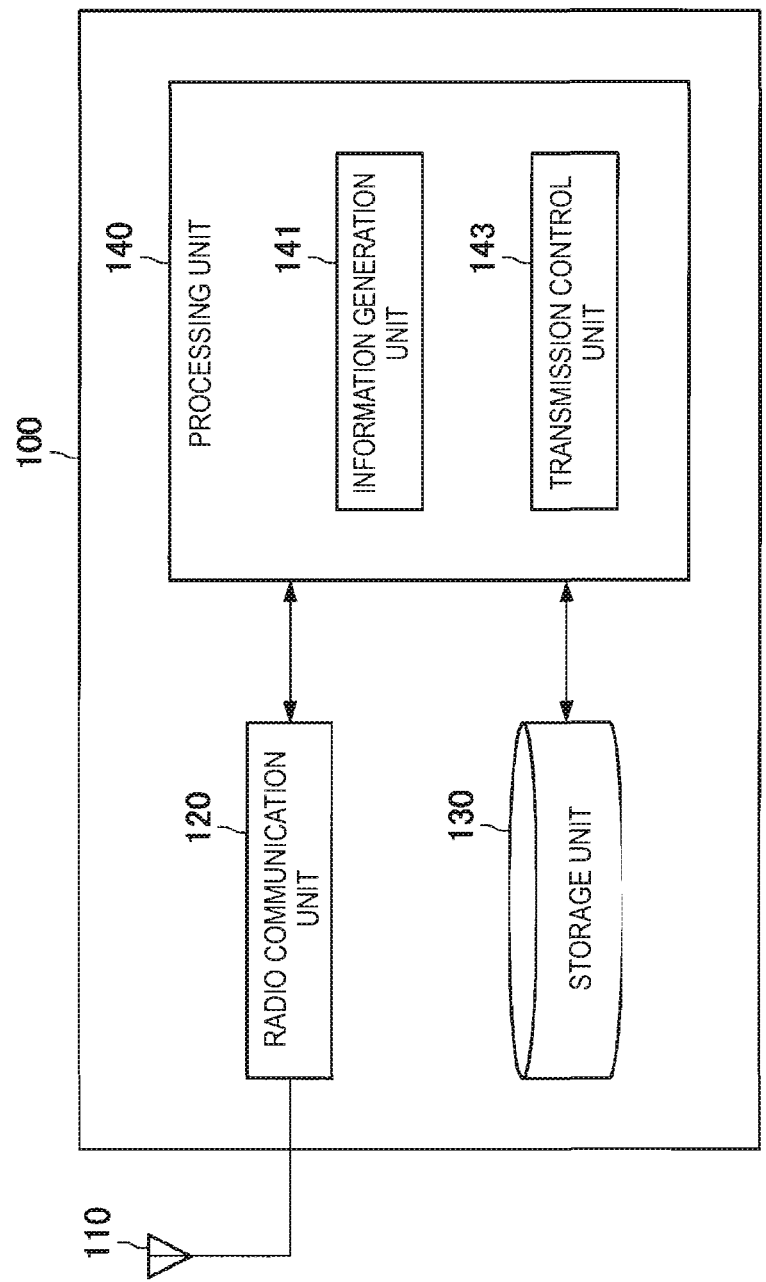
FIG. 6 is a block diagram illustrating an example of a configuration of the communication apparatus according to the embodiment.

Next, an example of a configuration of the communication apparatus 100 according to this embodiment will be described with reference to FIGS. 6-8. FIG. 6 is a block diagram illustrating an example of a configuration of the communication apparatus 100 according to this embodiment. Referring to FIG. 6, the communication apparatus 100 includes an antenna unit 110, a radio communication unit 120, a storage unit 130, and a processing unit 140.

(Antenna Unit 110)

The antenna unit 110 radiates a signal output by the radio communication unit 120, as radio waves, into space. The antenna unit 110 also converts radio waves in space into a signal, and outputs the signal to the radio communication unit 120.

(Radio Communication Unit 120)

The radio communication unit 120 performs wireless communication. For example, the radio communication unit 120 transmits a signal or receives a signal.

For example, the radio communication unit 120 performs wireless communication with the base station 10. More specifically, for example, the radio communication unit 120, when located within the communication area e a cell) of the base station 10, receives a downlink signal transmitted by the base station 10, and transmits an uplink signal to the base station 10.

Also, for example, the radio communication unit 120 performs wireless communication with a second apparatus other than the base station 10. More specifically, for example, the radio communication unit 120 receives a signal from the second apparatus, and transmits a signal to the second apparatus.

(Storage Unit 130)

The storage unit 130 temporarily or permanently stores a program and data for operating the conununication apparatus 100.

(Processing Unit 140)

The processing unit 140 provides various functions of the communication apparatus 100. The processing unit 140 includes an information generation unit 141 and a transmission control unit 143.

(Information Generation Unit 141)

The information generation unit 141 generates information related to data (i.e., data-related information) which is wirelessly transmitted or received without being routed via the base station 10.

—Information for Charging—

In a first example, the data-related information is information for chargi for the transmission or reception of the data.

Destination and Destination

For example, the data-related information contains information indicating at least one of the source and destination of the data. More specifically, for example, the data-related information is addresses (e.g., Internet protocol (IP)

addresses, media access control (MAC) addresses, etc.) of the source and destination of the data, or other identification information of the source and destination of the data. Such information can, for example, be used to identify an apparatus or user to be charged.

Amount of Radio Resources/Amount of Data

Amount of Radio Resources

For example, the data-related information contains information indicating the amount of radio resources used for the transmission or reception of data. More specifically, for example, the data-related information contains, as the information indicating the amount of radio resources, the number of resource blocks, the number of slots, the number of sub-frames, and the like. Such information can, for example, be used to charge on the basis of the amount of radio resources used.

Amount of Data

Note that the data-related information may contain information indicating the amount of data instead of or in addition to the information indicating the amount of radio resources. More specifically, for example, the data-related information may contain, as the information indicating the amount data, information indicating a data size, the amount of packets, etc. Such information can, for example, be used to charge on the basis of the amount of data transmitted or received.

Case Where Communication Error Occurs

A communication error (e.g., an error on a physical link) may occur during transmission or reception of data. Therefore, there may be a number of techniques of calculating the amount of radio resources or the amount of data.

For example, in a first calculation technique, the amount of all radio resources used for transmission or reception of data (or the amount of all data transmitted or received) is calculated irrespective of whether a communication error occurs. Thereafter, data-related information containing information indicating the amount of all radio resources (or the amount of all data) is generated.

For example, in a second calculation technique, the amount of radio resources used when a communication error does not occur (or the amount of data transmitted or received when a communication error does not occur) is calculated. Thereafter, data-related information containing information indicating the radio resource amount (or the data amount) is generated. According to the second calculation technique, for example, a situation where the amount of charge exceeds what is expected by the user, due to the occurrence of a communication error, can be avoided.

When the second calculation technique is employed, the scheme of retransmission control (e.g., hybrid automatic repeat-request (HARQ)) or cyclic redundancy check (CRC) may be utilized in order to calculate the radio resource amount or the data amount, for example.

For example, the communication apparatus 100, when being a source of data, calculates the amount of radio resources on the basis of ACK/NACK of HARQ. Specifically, the communication apparatus 100, when receiving ACK, adds the amount of radio resources used in transmission of data corresponding to the ACK, to the calculated amount of radio resources. Meanwhile, the communication apparatus 100, when receiving NACK, does not add the amount of radio resources used in transmission of data corresponding to NACK, to the calculated amount of radio resources. The communication apparatus 100, when receiving neither ACK nor NACK, does not add the amount of radio resources used in transmission of corresponding data, to the calculated amount of radio resources. Although an example of the amount of radio resources has been described, the amount of data is calculated in a similar fashion.

For example, the communication apparatus 100, when being a destination of data, calculates the amount of radio resources on the basis of the result of error detection by CRC. Specifically, when an error has not been detected by CRC (i.e., CRC is successful), the communication apparatus 100 adds the amount of radio resources used in transmission of data corresponding to the CRC, to the calculated amount of radio resources. Meanwhile, when an error has been detected by CRC, the communication apparatus 100 does not add the amount of radio resources used in transmission of data corresponding to the CRC, to the calculated amount of radio resources.

Note that data-related information is generated, and transmitted as described below, each time it is found that a communication error has not occurred. For example, each time the communication apparatus 100 receives ACK, the communication apparatus 100, when being a source of data, may calculate the amount of radio resources used in transmission of data corresponding to the ACK (or the amount of the data), and generate and transmit data-related information containing information indicating that amount. Alternatively, each time CRC is successful, the communication apparatus 100, when being a destination of data, calculates the amount radio resources used in transmission of data corresponding to the CRC (or the amount of the data), and generate and transmit data-related information containing information indicating that amount.

Others

Note that the data-related information may contain other information. As an example, the data-related information may contain information related to an application corresponding to the data (e.g., infoiivation indicating the type of the application, information indicating the application, etc.). As another example, the data-related information may contain a communication form (e.g., D2D communication, communication within an LN, relay, etc.).

As described above, for example, the data-related information is information for charging for the transmission or reception of the data. Such data-related information can, for example, be used to manage charging for wireless communication which is performed without routing via the base station 10.

Information for Lawful Interception (LI)

As a second example, the data-related information is information for lawful interception (LI).

Destination and Destination

For example, the data-related information contains information containing at least one of the source and destination of the data. More specifically, for example, the data-related information is addresses (e.g., an IP address, a MAC address, etc.) of the source and destination of the data, or other identification information of the source and destination of the data. Such information can, for example, be used to identify an apparatus or user which transmits or receives data.

Data

For example, the data-related information contains the data (i.e., data transmitted or received without being routed via the base station 10). Such information can, for example, be used to check transmitted or received data itself.

Others

Note that the data-related information may contain other information. As an example, the data-related information may contain information related to an application corresponding to the data. As another example, the data-related information may contain information indicating a communication form.

As described above, for example, the data-related information is information for LI. Such data-related information can, for example, be used to perform lawful interception (LI) for wireless communication which is performed without routing via the base station 10. Note that, for example, when two apparatus transmit and receive data, then if at least one of the two apparatuses is an apparatus for LI, information (data-related information) for LI is generated and transmitted.

Unit of Generation of Data-Related Information

The information generation unit 141 may generate the data-related information in various units. For example, the information generation unit 141 may generate the data-related information on a packet-by-packet basis, or may generate the data-related information about data which is transmitted or received during a predetermined period of time, or may generate the data-related information which is transmitted or received during a period of time between the start and end of a session (or connection).

(Transmission Control Unit 143)

The transmission control unit 143 controls transmission of the data-related information to a node which is not involved in the transmission or reception of the data (i.e., data transmitted or received without being routed via the base station 10).

Node Not Involved in Transmission or Reception of Data

The node which is not involved in the transmission or reception of the data (i.e., a node which is a destination of the data-related information) is the management node 20.

As described above, in a first example, the data-related information is information for charging for the transmission or reception of the data. In this case, the management node 20 is a node which manages charging. More specifically, for example, the management node 20 is a policy and charging rule function (PCRF).

Also, as described above, in a second example, the data-related information is information for lawful interception (LI). In this case, the management node 20 is a node for performing a process for LI. The process includes, for example, storing the information for LI to a storage device. The storage device may be a storage device included in the management node 20, or a storage device included in another node. As an example, the management node 20 is a packet data network (PDN) gateway (P-GW).

Path for Transmission of Data-Related Info mation

For example, the data-related information is transmitted to the management node 20 via the base station 10. A specific example of this will now be described with reference to FIG. 7.

Figure 7:
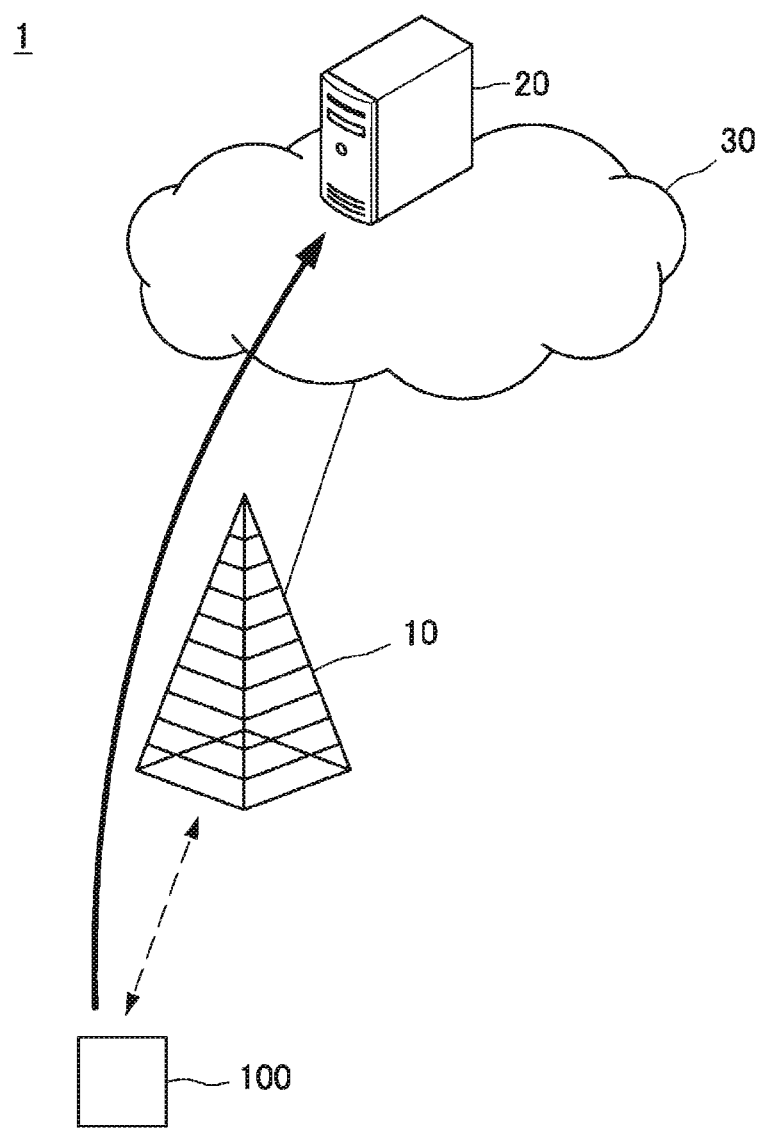
FIG. 7 is an illustrative diagram for describing a first example of a transmission path for data-related information.

FIG. 7 is an illustrative diagram for describing a first example of a transmission path for data-related information. Referring to FIG. 7, the base station 10, the management node 20, and the communication apparatus 100 are shown. In this example, the management node 20 is located in the core network 30, and the communication apparatus 100 transmits the data-related information to the management node 20 via the base station 10 and the core network 30.

Note that the transmission path in this embodiment is not limited to this example. For example, the data-related information may be transmitted to the management node 20 without being routed via the base station 10 instead of being transmitted to the management node 20 via the base station 10. A specific example of this will now be described with reference to FIG. 8.

Figure 8:
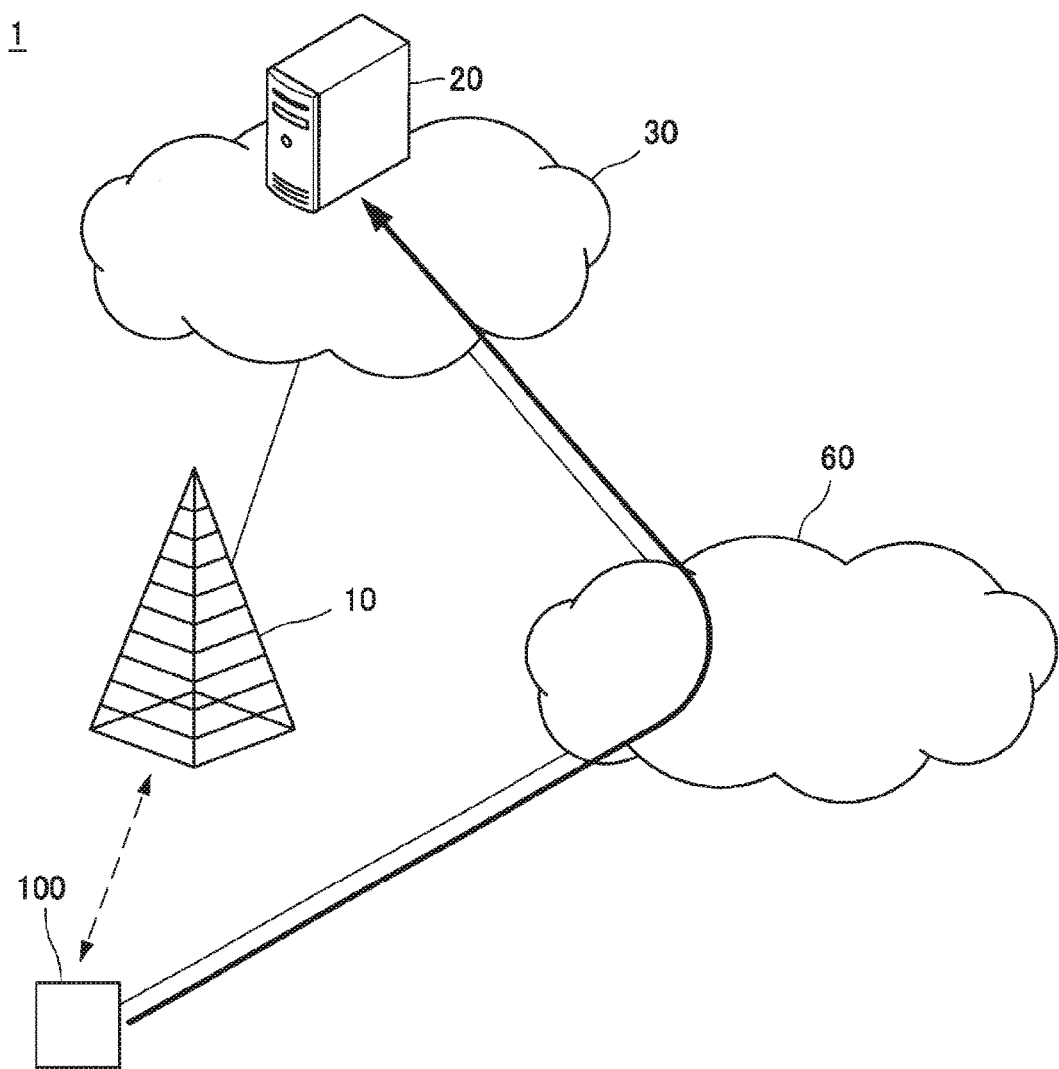
FIG. 8 is an illustrative diagram for describing a second example of a transmission path for data-related information.

FIG. 8 is an illustrative diagram for describing a second example of the transmission path for the data-related information. Referring to FIG. 7, the base station 10, the management node 20, and the communication apparatus 100 are shown. In this example, the management node 20 is located in the core network 30, and the communication apparatus 100 transmits the data-related information to the management node 20 via an external network 60 and the core network 30. The external network 60 includes, for example, the Internet. As an example, the communication apparatus 100 connects to a wired LAN or a wireless LAN, and transmits the data-related information to the management node 20 via the Internet.

Specific Examples of Control

As an example, as control of transmission of the data-related information, the transmission control unit 143 generates one or more packets each containing a portion or the entirety of the data-related information, which are to be sent to the management node 20. Thereafter, the transmission control unit 143 causes the radio communication unit 120 to transmit the one or more packets.

As another example, the transmission control unit 143 may generate control information for a mobile communication network containing the data-related information, and cause the radio communication unit 120 to transmit the control information.

As still another example, the transmission control unit 143 may trigger transmission of the data-related information. Specifically, the transmission control unit 143 may instruct another component (e.g., another component included in the processing unit 140) of the communication apparatus 100 to transmit the data-related information.

The data-related information is thus generated and transmitted. As a result, for example, management involved with wireless communication without routing via the base station 10 can be performed.

3. FLOW OF PROCESS

Next, examples of the process according to this embodiment will be described with reference to FIGS. 9-12.

(Flow of Entire Process)

First Example

Figure 9:
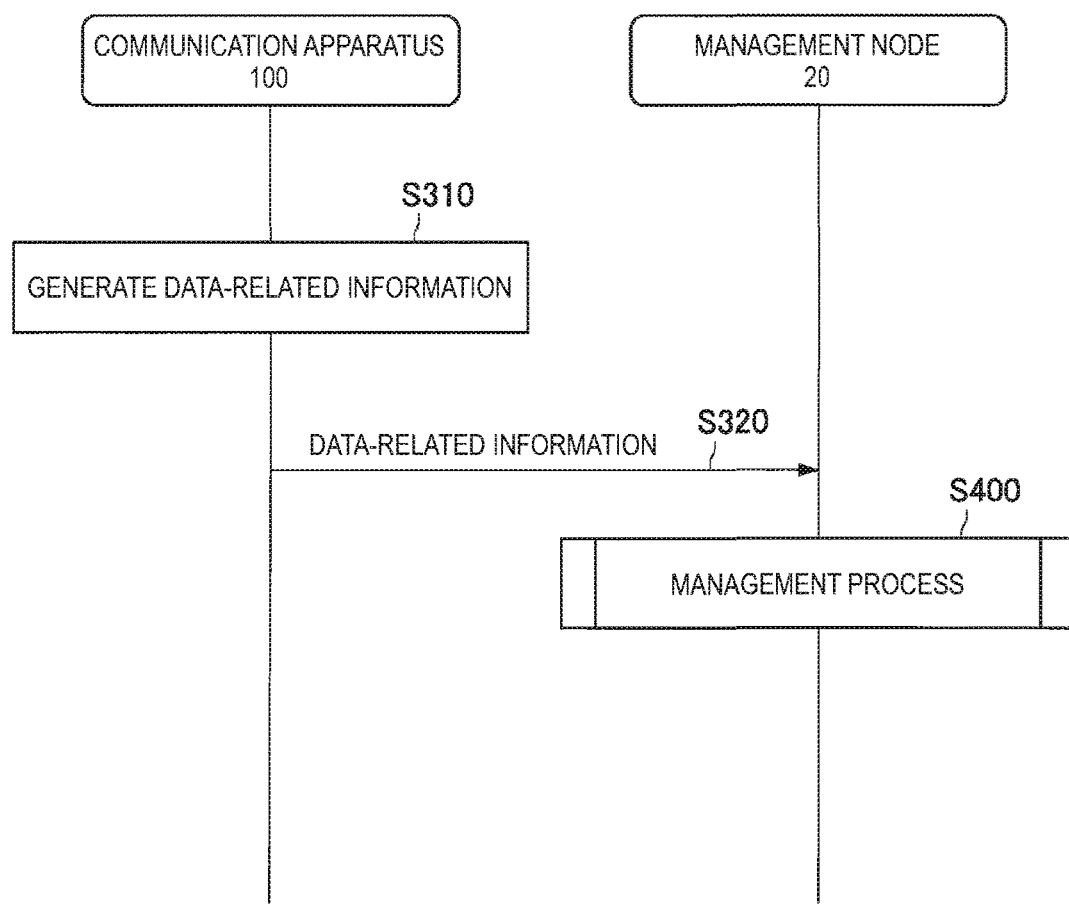
FIG. 9 is a sequence diagram illustrating a first example of a general flow of an entire process according to the embodiment.

FIG. 9 is a sequence diagram illustrating a first example of a general flow of the entire process according to this embodiment. This process is performed after transmission or reception of data without routing via the base station 10.

Initially, the communication apparatus 100 generates information related to data (i.e., data-related information) which is wirelessly transmitted or received without being routed via the base station 10 (S310).

Thereafter, the communication apparatus 100 transmits the data-related information to the management node 20, and the management node 20 receives the data-related information (S320).

Thereafter, the management node 20 executes a management process using the data-related information (S400).

Second Example

Figure 10:
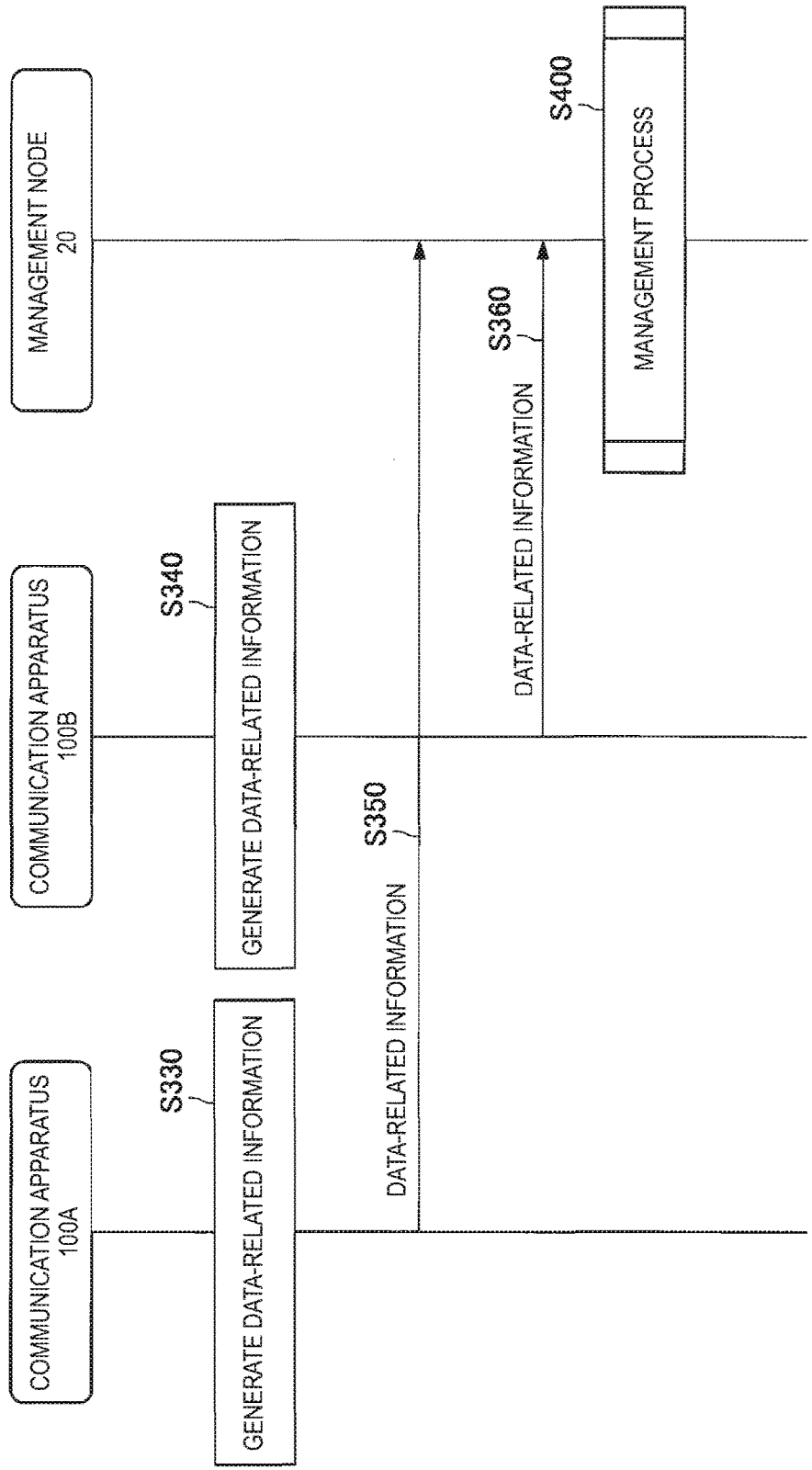
FIG. 10 is a sequence diagram illustrating a second example of a general flow of an entire process according to the embodiment.

FIG. 10 is a sequence diagram illustrating a second example of a general flow of the entire process according to this embodiment. The process is executed after transmission or reception of data without routing via the base station 10.

Initially, a communication apparatus 100A and a communication apparatus 100B each generate information related to data (i.e., data-related information) which is wirelessly transmitted or received without being routed via the base station 10 (S330, S340).

Thereafter, the communication apparatus 100A and the communication apparatus 100B each transmit the data-related information to the management node 20, and the management node 20 receives the data-related information (S350, S360).

Thereafter, the management node 20 executes a management process using the data-related information (S400).

(Examples of Management Process)

First Example

Charging

Figure 11:
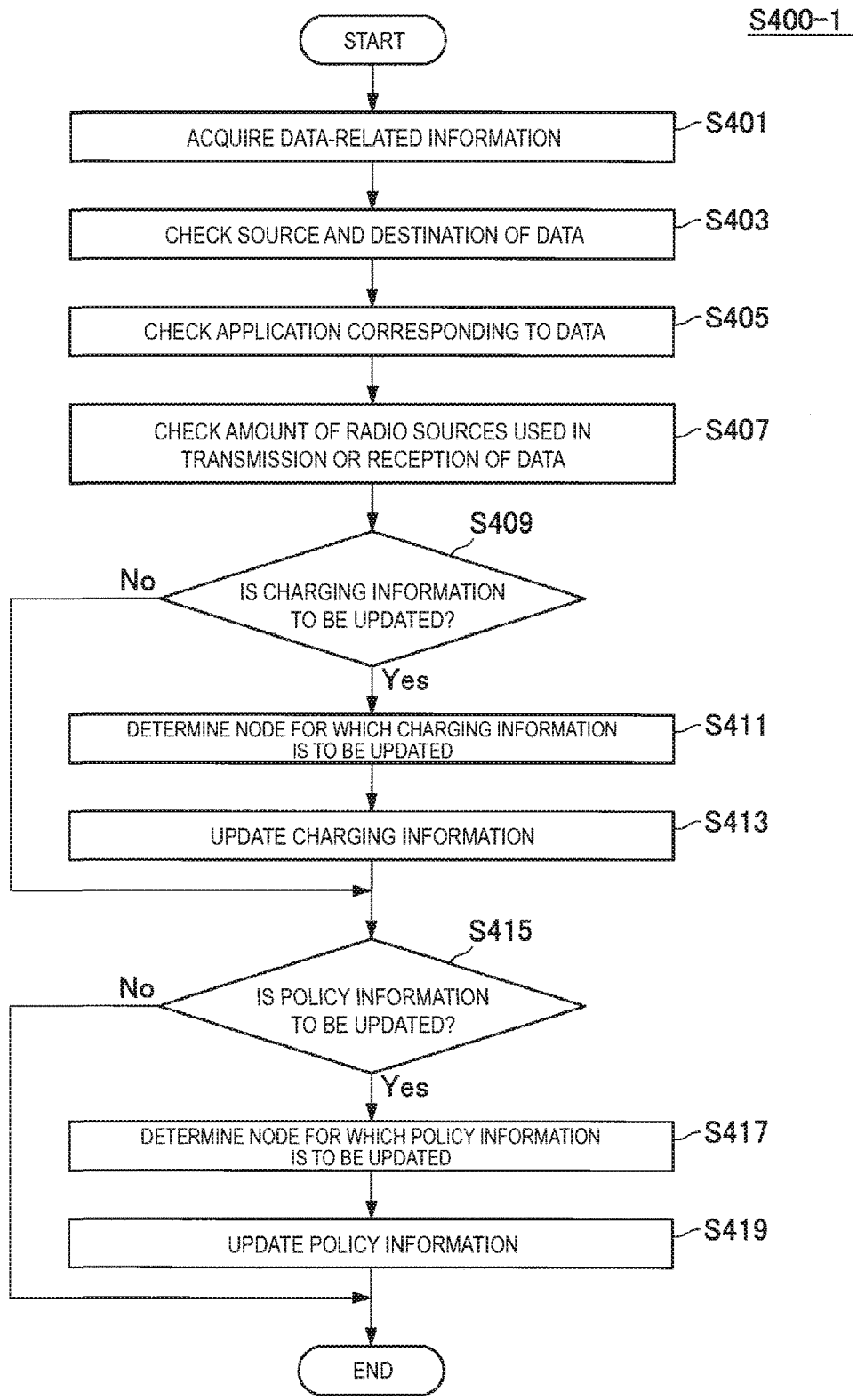
FIG. 11 is a flowchart illustrating an example of a general flow of a first example of a management process according to the embodiment.

FIG. 11 is a flowchart illustrating an example of a general flow of a first example of the management process according to this embodiment. The first example of the management process is a process for charging manage Initially, the management node 20 acquires data-related information transmitted by the communication apparatus 100 (S401). Thereafter, the management node 20 checks the source and destination of data which is transmitted or received without being routed via the base station 10a, an application corresponding to the data, and the amount of radio resources used in the transmission or reception of the data (S403, S405, S407).

Thereafter, the management node 20, when determining to update charging information (S409: YES), determines a node for which charging information is to be updated (S411), and updates the charging information of the node (S413).

Also, the management node 20, when determining to update policy information related to charging (S415: YES), determines a node for which policy information is to be updated (S417), and updates the policy information of the node (S419). Thereafter, the process is ended.

Second Example

Lawful Interception (LI)

Figure 12:
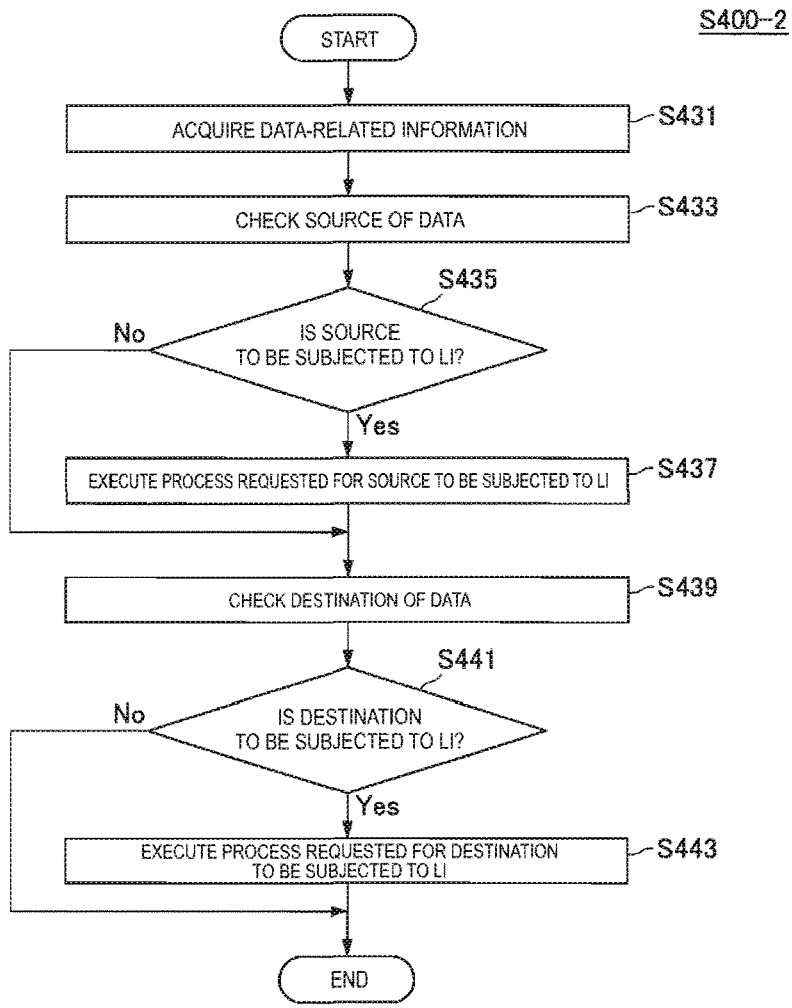
FIG. 12 is a flowchart illustrating an example of a general flow of a second example of a management process according to the embodiment.

FIG. 12 is a flowchart illustrating an example of a general flow of a second example of the management process according to this embodiment. The second example of the management process is a process for LI.

Initially, the management node 20 acquires data-related information transmitted by the communication apparatus 100 (S431).

Thereafter, the management node 20 checks the source of data which is transmitted or received without being routed via the base station 10 (S433). Thereafter, the management node 20, when determining that the source is to be subjected to LI (S435: YES), executes a process requested for the source to be subjected to LI (S437). The process includes storing information for LI (e.g., the data and the source and destination of the data, etc.) to a storage device.

The management node 20 also checks the destination of the data (S439). Thereafter, the management node 20, when determining that the destination is to be subjected to LI (S441: YES), executes a process requested for the destination to be subjected to LI (S443). The process includes storing information for LI to a storage device. Thereafter, the process is ended.

4. VARIATIONS

Next, variations according to this embodiment will be described with reference to FIGS. 13 and 14.

Frequency Band Used in Transmission of Data and Data-Related Information

A frequency band used in wireless communication which is performed without routing via a base station (e.g., D2D communication, communication in an LN, etc.) may be the same as or different from a frequency band used in wireless communication with a base station. The frequency band is, for example, a component carrier for a cellular network, a channel for wireless LAN, or the like.

In a variation according to this embodiment, a frequency band used in wireless communication which is performed without routing via a base station (e.g., D2D communication, communication in an LN, etc.) (hereinafter referred to as a "first frequency band") is different from a frequency band used in wireless communication with a base station (hereinafter referred to as a "second frequency band")). Moreover, the second frequency band is a band having lower frequencies than those of the first frequency band. A specific example of this example will now be described with reference to FIG. 13.

Figure 13:
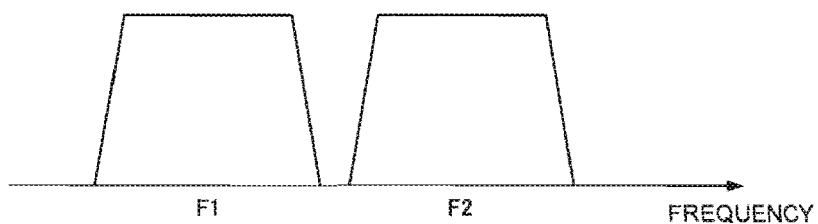
FIG. 13 is an illustrative diagram for describing an example of frequency bands.

FIG. 13 is an illustrative diagram for describing an example of the frequency bands. Referring to FIG. 13, a frequency band F1 and a frequency band F2 are shown. For example, the frequency band F1 is a frequency band which is used in wireless communication with the base station 10, and the frequency band F2 is a frequency band which is used in wireless communication which is performed without routing via the base station 10. The frequency band F1 is a band having lower frequencies than those of the frequency band F2.

Also, for example, the second frequency band (a band having higher frequencies) is used to wirelessly transmit or receive data without routing via the base station 10, and the first frequency band (a band having lower frequencies) is used to transmit information related to the data data-related information) to the base station 10.

As a result, radio resources can be more effectively used. More specifically, for example, it is assumed that data-related information is transmitted to a base station which is located in a relatively far place. Therefore, the use of a band having lower frequencies (i.e., the first frequency band), which are less attenuated, may reduce the possibility that a communication error occurs in transmission of the data-related information. In other words, radio resources are more effectively used. For example, it is also assumed that data is transmitted or received between apparatuses located relatively close to each other. Therefore, for example, transmission may be performed by using a band having higher frequencies (i.e., the second frequency band), which are significantly attenuated. Also, in the high-frequency band, radio resources having a wider band width can be provided. In other words, radio resources can be more effectively used.

Allocation of Radio Resources for Transmission of Data and Data-Related Information Radio resources for transmission of data-related information (hereinafter referred to as "first radio resources") and radio resources for transmission of data (hereinafter referred to as "second radio resources") are allocated (e.g. by the base station 10).

For example, the first radio resources and the second radio resources are allocated as a set of radio resources. As a result, for example, it is not necessary to request allocation of the first radio resources and allocation of the second radio resources separately. For example, even when the first radio resources (radio resources for transmission of data-related information) are not independently requested, then if the second radio resources (radio resources for transmission of data) are requested, transmission of data-related information is allowed. Note that, in this case, data-related information is generated by the time when allocation of radio resources is requested.

Moreover, the first radio resources and the second radio resources are allocated so that there is a predetermined offset in time between the first radio resources and the second radio resources. A specific example of this will now be described with reference to FIG. 14.

Figure 14:
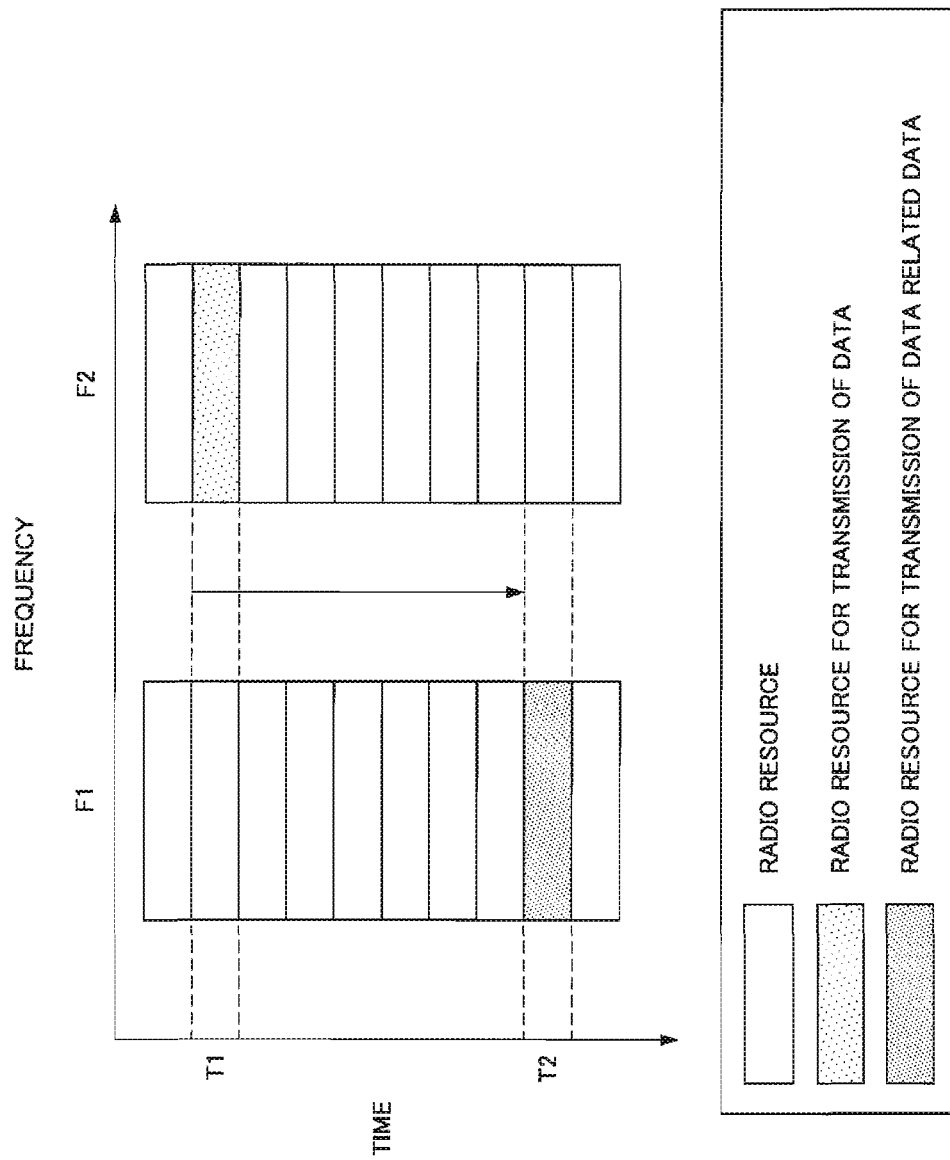
FIG. 14 is an illustrative diagram for describing an example of first radio resources and second radio resources.

FIG. 14 is an illustrative diagram for describing an example of the first radio resources and the second radio resources. Referring to FIG. 14, the radio resources of the frequency band F1 and the radio resources of the frequency band F2 are shown. For example, as radio for transmission of data (i.e., the second radio resources), the radio resources of time T1 of the frequency band F2 are allocated. As radio resources for transmission of corresponding data-related information (i.e., the first radio resources), the radio resources of time T2 of the frequency band 1 are allocated. Here, the time T2 is time later than the time T1 by a predetermined offset. For example, thus, there is a predetermined offset (T2-T1) in time between the first radio resources and the second radio resources.

Note that the predetermined offset may be represented in units of sub-frames, slots, or the like in a cellular network. The predetermined offset may be represented in units of inter-frames (IF) or the like in a wireless LAN. Alternatively, the predetermined offset may be represented in units of seconds or the like. The length of the predetermined offset may, for example, be previously determined as a fixed value in a communication system, or may be set as appropriate in a communication system. The communication apparatus 100 (or other apparatuses) may be notified of the length of the predetermined offset at any timing (e.g., regularly). This notification may be performed by any of broadcast, multicast, and unicast.

5. APPLICATIONS

Technology according to the present disclosure is applicable to various products. For example, a the communication apparatus 100 may be implemented as a mobile terminal such as a smartphone, a tablet personal computer (PC), a notebook PC, a portable game terminal, a portable/dongle type mobile router, and a digital camera, or an in-vehicle terminal such as a car navigation apparatus. The communication apparatus 100 may also be implemented as a terminal (that is also referred to as a machine type communication (MTC) terminal) that performs machine-to-machine (M2M) communication. Alternatively, the communication apparatus 100 may be implemented as a relay node or an apparatus included in a relay node. Moreover, at least a portion of the components of the communication apparatus 100 may be implemented as a module (e.g., an integrated circuit module including a single die) mounted on these terminals or apparatuses.

First Application Example

Figure 15:
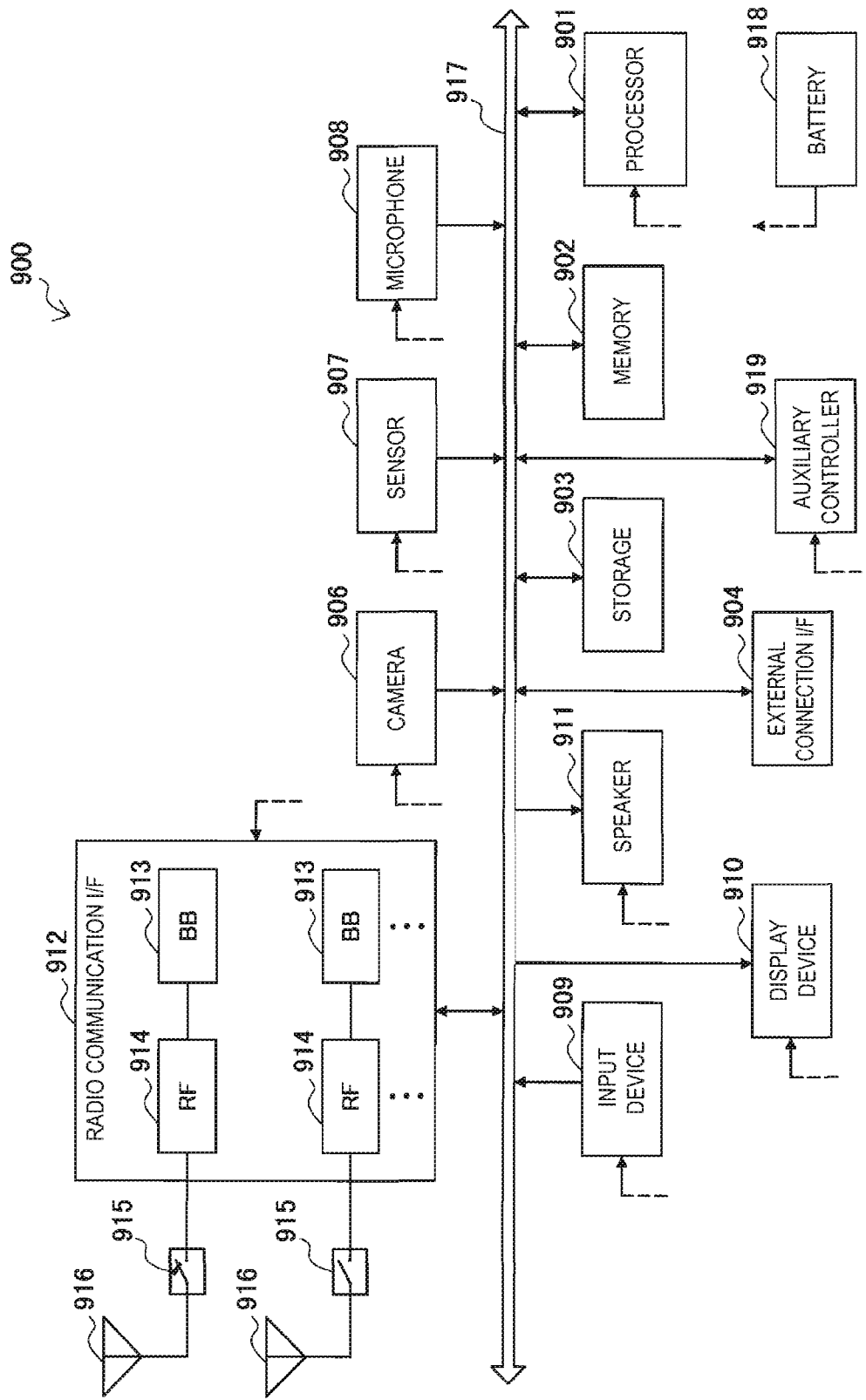
FIG. 15 is a block diagram illustrating an example of a general configuration of a smartphone.

FIG. 15 is a block diagram illustrating an example of a general configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919, The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LIE and LIE-Advanced, and performs radio communication. The radio communication interface 912 may typically include, for example, a BB processor 913 and an RF circuit 914. The BB processor 913 may perform, for example, encoding/decoding, modulating idemodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 15. Although FIG. 15 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular conunumication scheme, the radio communication interface 912 may support another type of radio communication scheme such as a short-distance wireless communication scheme, a near field communication scheme, and a radio local area network (TAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 15. Although FIG. 15 illustrates the example in which the smartphone 900 includes the multiple antennas 916, the smartphone 900 may also include a single antenna 916.

Furthermore, the smartphone 900 may include the antenna 916 for each radio conunuication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 15 via feeder lines, which are partially shown as dashed lines in the figure. The auxiliary controller 919 operates a minimum necessary function of the smartphone 900, for example, in a sleep mode.

In the smartphone 900 shown in FIG. 15, the information generation unit 141 and the transmission control unit 143 described with reference to FIG. 6 may be implemented in the processor 901 or the auxiliary controller 919. Alternatively; at least a portion of these components may be implemented in the radio communication interface 912. As an example, the smartphone 900 may include a module including the processor 901, the auxiliary controller 919, and/or a portion (e.g., the BB processor 913) or the entirety of the radio communication interface 912. In this module, the information generation unit 141 and the transmission control unit 143 may be implemented. In this case, the module may store a program for causing the processor to function as the information generation unit 141 and the transmission control unit 143 (in other words, a program for causing the processor to execute operations of the information generation unit 141 and the transmission control unit 143), and execute the program. As another example, a program for causing the processor to function as the information generation unit 141 and the transmission control unit 143 may be installed in the smartphone 900, and executed by the processor 901, the auxiliary controller 919, and/or the radio communication interface 912 (e.g., the BB processor 913). As described above, the smartphone 900 or the module may be provided as an apparatus including the information generation unit 141 and the transmission control unit 143, and a program for causing a processor to function as the information generation unit 141 and the transmission control unit 143 may be provided. A readable storage medium storing the program may also be provided.

Second Application Example

Figure 16:
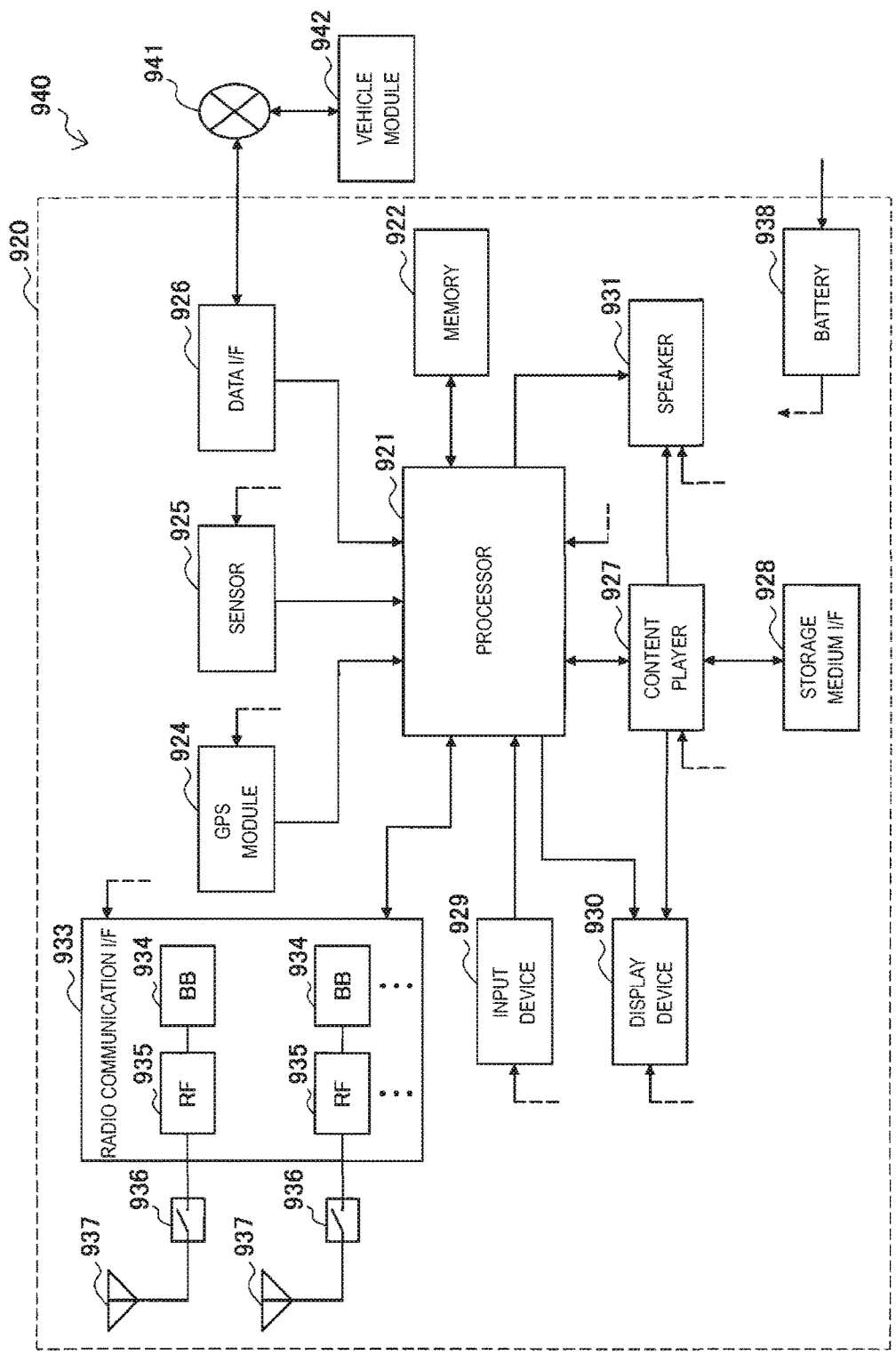
FIG. 16 is a block diagram illustrating an example of a general configuration of a car navigation apparatus.

FIG. 16 is a block diagram illustrating an example of a general configuration of a car navigation apparatus 920 which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 16. Although FIG. 16 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 16. Although FIG. 16 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 16 via feeder lines that are partially shown as dashed lines in the figure. The battery 938 accumulates power supplied form the vehicle.

In the car navigation apparatus 920 shown in FIG. 16, the information generation unit 141 and the transmission control unit 143 described with reference to FIG. 6 may be implemented in the processor 921. Alternatively, at least a portion of these components may be implemented in the wireless communication interface 933. As an example, the car navigation apparatus 920 may include a module including the processor 921 and/or a portion (e.g., the BB processor 934) or the entirety of the radio communication interface 933. In this module, the information generation unit 141 and the transmission control unit 143 may be implemented. In this case, the module may store a program for causing the processor to function as the information generation unit 141 and the transmission control unit 143 (in other words, a program for causing the processor to execute operations of the information generation unit 141 and the transmission control unit 143), and execute the program. As another example, a program for causing the processor to function as the information generation unit 141 and the transmission control unit 143 may be installed in the car navigation apparatus 920, and executed by the processor 921 and/or the radio communication interface 933 (e.g., the BB processor 913). As described above, the car navigation apparatus 920 or the module may be provided as an apparatus including the information generation unit 141 and the transmission control unit 143, and a program for causing the processor to function as the information generation unit 141 and the transmission control unit 143 may be provided. A readable storage medium storing the program may also be provided.

The technology of the present disclosure may also be implemented as an in-vehicle system (or a vehicle) 940 including one or more blocks of the car navigation apparatus 920, the in-vehicle network 941, and a vehicle module 942. Specifically, the in-vehicle system (or a vehicle) 940 may be provided as an apparatus including the information generation unit 141 and the transmission control unit 143. The vehicle module 942 generates vehicle data such as vehicle speed, engine speed, and trouble information, and outputs the generated data to the in-vehicle network 941.

6. CONCLUSION

In the foregoing, the communication apparatus and processes according to an embodiment of the present disclosure have been described with reference to FIGS. 1-16. According to the embodiment of the present disclosure, the communication apparatus 100 includes the information generation unit 141 which generates data-related information related to data which is wirelessly transmitted or received without being routed via the base station 10, and the control unit which controls transmission of the data-related information to a node which is not involved in the transmission or reception of the data. As a result, for example, management involved with wireless communication without routing via a base station can be performed.

Data
D2 D
For example, the data is data which is transmitted or received by D2D communication. As a result, for example, management involved in D2D communication can be performed.

Localized Network (LN)
For example, the data is data which is transmitted or received in an LN. As a result, for example, management involved with wireless communication in an LN can be performed.

Relay
For example, the data is data which is transmitted or received via a relay node. As a result, for example, management involved with wireless communication via a relay node can be performed.

Data-Related Information
Charging
For example, the data-related information is information for charging for the transmission or reception of the data. As a result, for example, charging management for wireless communication without routing via the base station 10 can be performed.

Lawful Interception (LI)
For example, the data-related information is information for lawful interception (LI). As a result, for example, lawful interception (LI) for wireless communication without routing via the base station 10 can be performed.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, an example has been described in which data which is transmitted or received without routing via a base station is transmitted or received according to the same wireless communication scheme as that which is used by the base station. The present disclosure is not limited to this example. For example, the data may be transmitted or received according to a wireless communication scheme which is different from that which is used by the base station.

Also, for example, an example in which a management node is a core network node has been described. The present disclosure is not limited to this example. A management node may be a node which is in a mobile communication network and is not located in a core network (e.g., abuse station). Alternatively, a management node may be a node which is not a node in a mobile communication network, and is out of a mobile communication network.

Also for example, an example in which data-related information is information for charging for the transmission or reception of the data, and an example in which data-related information is information for lawful interception (LI), have been described. The present disclosure is not limited to this example. For example, data-related information may be information for other managements.

Also, the processing steps in each process in this specification are not strictly limited to being executed in a time series following the sequence described in a flowchart. For example, the processing steps in each process may be executed in a sequence that differs from a sequence described herein as a flowchart, and furthermore may be executed in parallel.

In addition, it is possible to create a computer program for causing hardware such as a CPU, ROM, and RAM built into a device according to an embodiment of the present disclosure (a communication control device or a terminal device) to exhibit functions similar to each structural element of the foregoing devices. Also, a storage medium having such a computer program stored therein may also be provided. Also, an information processing device (e.g., a processing circuit or chip) equipped with memory storing such a computer program (e.g., ROM and RAM) and one or more processors capable of executing such a computer program (such as a CPU or DSP, for example) may also be provided.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

(1)
An apparatus including:
a generation unit configured to generate information related to data wirelessly transmitted or received without being routed via a base station; and
a control unit configured to control transmission of the information to a node which is not involved in the transmission or reception of the data, (2)
The apparatus according to (1),
wherein the apparatus is a communication apparatus involved in the transmission or reception of the data, or a module for the communication apparatus.

(3)
The apparatus according to (1) or (2),
wherein the data is data transmitted or received by apparatus-to-apparatus communication.

(4)
The apparatus according to (1) or (2),
wherein the data is data transmitted or received in a localized network.

(5)
The apparatus according to (1) or (2),
wherein the data is data transmitted or received via a relay node, (6)
The apparatus according to any one of (1) to (5),
wherein the data is data transmitted or received according to a same wireless communication scheme as a wireless communication scheme used by the base station, (7)
The apparatus according to any one of (1) to (6),
wherein the node which is not involved in the transmission or reception of the data is a node for performing management involved with wireless communication.

(8)
The apparatus according to (7),
wherein the node which is not involved in the transmission or reception of the data is a node in a mobile communication network including the base station.

(9)
The apparatus according to any one of (1) to (8),
wherein the information is information for charging for the transmission or reception of the data.

(10)
The apparatus according to (9),
wherein the information includes information indicating the amount of radio resources used in the transmission or reception of the data.

(11)
The apparatus according to (9) or (10),
wherein the information includes information indicating the amount of the data.

(12)
The apparatus according to any one of (9) to (11),
wherein the node which is not involved in the transmission or reception of the data is a node for performing charging management.

(13)
The apparatus according to any one of (1) to (8),
wherein the information is information for lawful interception.

(14)
The apparatus according to (13),
wherein the information includes the data.

(15)
The apparatus according to (13) or (14),
wherein the node which is not involved in the transmission or reception of the data is a node for performing a process for the lawful interception.

(16)
The apparatus according to any one of (1) to (15),
wherein the information includes information indicating at least one of a source and a destination of the data.

(17)
The apparatus according to any one of (1) to (16),
wherein the apparatus includes
a memory configured to store a program, and
one or more processors configured to be capable of executing the program, and
wherein the program is a program for causing the one or more processors to function as the generation unit and the control unit.

(18)
A program for causing a processor to execute:
generating information related to data wirelessly transmitted or received without being routed via a base station; and
controlling transmission of the information to a node which is not involved in the transmission or reception of the data.

(19)
A method including:
generating information related to data wirelessly transmitted or received without being routed via a base station; and
controlling transmission of the information to a node which is not involved in the transmission or reception of the data.

REFERENCE SIGNS LIST

1 communication system
10 base station
20 management node
100 communication apparatus
141 information generation unit
143 transmission control unit

The invention claimed is:

1. An apparatus, comprising:
processing circuitry configured to
generate information related to data that is wirelessly transmitted to or received from a second apparatus, on a frequency band that is a component carrier used in wireless communication with a base station that services the apparatus and the second apparatus, without being routed via the base station, the information relating to charging of the second apparatus that wirelessly transmits or receives the data;
transmit the information to the second apparatus via direct apparatus-to-apparatus communication; and
control transmission of the information to a node, which is not involved in the wireless transmission or reception of the data, without the information being routed via the base station.

2. The apparatus according to claim 1, wherein the data is transmitted or received in a localized network.

3. The apparatus according to claim 1, wherein the data, is transmitted or received via a relay node.

4. The apparatus according to claim 1, wherein the data is transmitted or received according to a same wireless communication scheme as a wireless communication scheme used by the base station.

5. The apparatus according to claim 1, wherein the node which is not involved in the transmission or reception of the data performs management involved with wireless communication.

6. The apparatus according to claim 5, wherein the node which is not involved in the transmission or reception of the data is in a mobile communication network that includes the base station.

7. The apparatus according to claim 1, wherein the information includes information indicating the amount of radio resources used in the transmission or reception of the data.

8. The apparatus according to claim 1, wherein the information includes information indicating the amount of the data.

9. The apparatus according to claim 8, wherein the node is configured to receive the information transmitted from the apparatus, and update charging information based on the amount of the data indicated in the received information.

10. The apparatus according to claim 1, wherein the node which is not involved in the transmission or reception of the data is a node for performing charging management.

11. The apparatus according to claim 1, wherein the information is information for lawful interception.

12. The apparatus according to claim 11, wherein the information includes the data.

13. The apparatus according to claim 11, wherein the node, which is not involved in the transmission or reception of the data, performs a process for the lawful interception.

14. The apparatus according to claim 1, wherein the information includes information indicating at least one of a source and a destination of the data.

15. The apparatus according to claim 1, wherein the apparatus includes
a memory configured to store a program, and
the circuitry is configured to execute the program.

16. The apparatus according to claim 1, wherein the node is configured to receive the information transmitted from the apparatus, update charging information based on the received information, and determine whether to update policy information based on the charging information.

17. The apparatus according to claim 1, wherein the processing circuitry is configured to control the transmission of the information to the node on a second frequency band that is higher than the frequency band.

18. A non-transitory computer readable medium storing computer executable instructions that, when executed by a processor of an apparatus, cause the processor to:
generate information related to data that is wirelessly transmitted to or received from a second apparatus, on a frequency band that is a component carrier used in wireless communication with a base station that services the apparatus and the second apparatus, without being, routed via the base station, the information relating to charging of the second device that wirelessly transmits or receives the data;
transmit the information to the second apparatus via direct apparatus-to-apparatus communication; and
control transmission of the information to a node, which is not involved in the wireless transmission or reception of the data, without the information being routed via the base station.

19. A method comprising:
generating, by an apparatus, information related to data that is wirelessly transmitted to or received from a second apparatus, on a frequency band that is a component carrier used in wireless communication with a base station that services the apparatus and the second apparatus, without being routed via the base station, the information relating to charging of the second apparatus that wirelessly transmits or receives the data;
transmitting the information to the second apparatus via direct apparatus-to-apparatus communication; and
controlling transmission of the information to a node, which is not involved in the wireless transmission or reception of the data, without the information being routed via the base station.

* * * * *